Aug. 5, 1930.   J. CRITES   1,772,245
APPARATUS FOR TRANSPORTING FINELY DIVIDED MATERIAL
Original Filed June 11, 1927
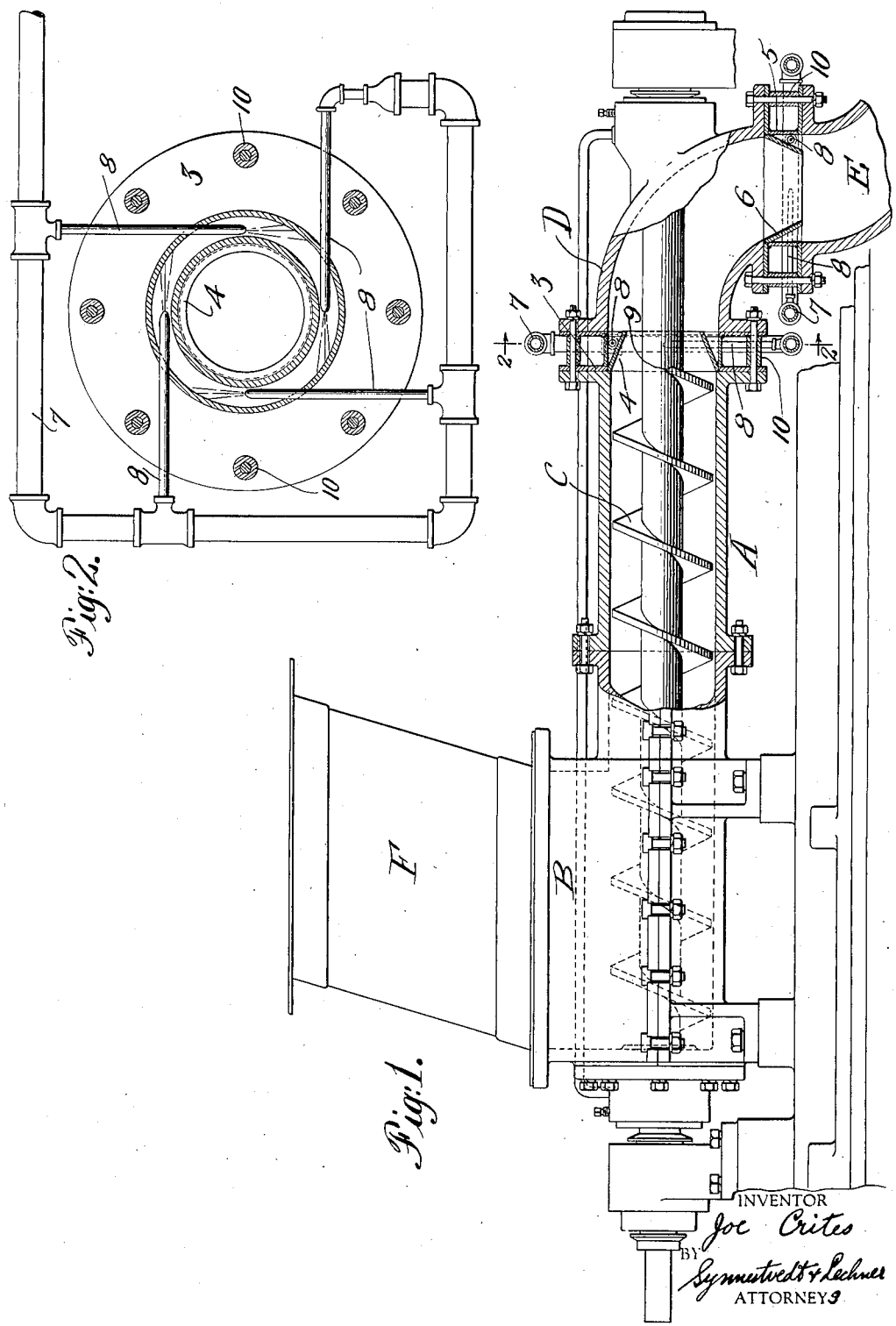
INVENTOR
Joe Crites
BY Synnestvedt & Lechner
ATTORNEYS Patented Aug. 5, 1930

1,772,245

UNITED STATES PATENT OFFICE

JOE CRITES, OF EVANSTON, ILLINOIS, ASSIGNOR TO INTERNATIONAL COMBUSTION ENGINEERING CORPORATION, OF NEW YORK, N. Y., A CORPORATION OF DELAWARE

APPARATUS FOR TRANSPORTING FINELY-DIVIDED MATERIAL

Application filed June 11, 1927, Serial No. 198,041. Renewed June 6, 1930.

This invention relates to apparatus for transporting finely divided material, such, for example, as pulverized coal.

The invention has to do with that class of transport apparatus in which the material is transported through a line by air under compression, the material being fed from a suitable source of supply to the sphere of action of the pneumatic pressure by means of a feeder screw.

In this class of apparatus "blowing back" of the air is to be prevented, and a number of different arrangements have been heretofore proposed for this purpose. In many instances, however, the desired result can only be obtained with heavy power consumption, and it is one of the primary objects of my invention to provide an effective transport device in which blowing back is prevented in a novel manner, and in which the power consumption is relatively small.

It is another object of my invention to so introduce the conveying air as to effectively sweep the inner surface of the transport line adjacent the barrel to prevent the accumulation of a deposit of coal thereon, with the objectionable effect of increasing the power consumption.

How the foregoing, together with such other objects and advantages as may hereinafter appear, or are incident to my invention, are realized is illustrated in the accompanying drawings, wherein—

Fig. 1 is a side elevation in partial section through a transport feeder embodying my invention, and Fig. 2 is an enlarged section taken on the line 2—2 of Fig. 1.

Referring now to the drawings, the reference character A denotes the feeder barrel having an inlet B to receive the material to be transported.

The feed screw is indicated at C. Secured to the discharge end of the barrel is a connection D for delivering the material discharged from the screw into the conveyor line E. Interposed between the barrel and the connection D is a ring-like member 3 carrying a petticoat nozzle 4 on the inside thereof. A second ring-like member 5 carrying a petticoat nozzle 6 is interposed between the connection D and the conveyor line E. Pulverized coal enters the inlet B from any suitable source of supply through the throat F, and is advanced through the barrel by the screw to the sphere of action of the compressed air. The compressed air for the transporting of the coal is discharged from the pipes 7 through the small discharge pipes 8 tangentially of the petticoat nozzles 4 and 6. The thread 9 of the feeder screw preferably terminates at the end of the barrel.

Under regular operating conditions the apparatus functions substantially as follows: The screw is rapidly revolved and advances the coal entering the inlet end of the barrel. Usually the leading flights of the screw do not run full, for the reason that a portion of the coal is rejected because of the centrifugal action of the rapidly revolving screw. The provision of the petticoat nozzle, however, causes the last flight or so of the screw to become filled with coal particles sufficiently densely disposed as to prevent the air from blowing back.

The air entering, as it does, tangentially of the petticoat nozzle is thereby given a whirling motion and sweeps the unaerated coal away from the inner surface of the discharge connection D. In fact, there is formed a cylindrical body of air within which enters the coal which is discharged from the petticoat nozzles. The major portion of the air thus surrounds the coal passing through the elbow or fitting, and thus prevents the accumulation of the deposit hereinbefore mentioned, and reduces friction and wear. An elbow-like fitting is required in order to provide a bearing on the forward end of the screw shaft, and the admission of air, as above described, overcomes the difficulties which otherwise inevitably would follow from the employment of such an elbow.

It has heretofore been proposed to overcome such difficulties by providing a ring of very small air ports, but such a ring has not been altogether satisfactory, and is, in addition, quite costly. By my arrangement the air may be admitted at a relatively small number of points with the results above mentioned. The second petticoat nozzle 6 is provided in cases where a second elbow follows the first one, or in cases where it is expected to transport relatively moist material.

Another advantage of my novel arrangement is that the conveying air, being delivered around the coal discharging from the barrel, does not disturb or agitate the coal, and, therefore, does not interfere with the action of the nozzles in preventing back flow.

It is to be understood that although, in the preferred form of my invention, the air from the air ports is discharged in a plane at right angles to the screw, this plane may also be at an oblique angle to the screw.

I have found by experience that by preventing the blow back and the lodging of material on the inner surface of the connection D, as hereinbefore described, the consumption of power necessary to revolve the feeder screw is relatively small. I also find that the transporter is economical of air and is able to transport for long distances with relatively low air pressure; also that I am enabled to use a shorter screw than has heretofore been required.

For simplicity of manufacture, I prefer to make the ring-like member of channel shape, welding the petticoat nozzle thereto as indicated. In assembling the parts, spacer sleeves 10 are employed to permit of securing the parts together without injury to the relatively light ring.

I claim:—

1. In a transport for finely divided material, the combination of a feeder barrel, a feed screw therefor, a conveyor line into which the barrel discharges, a ring-like member carrying a petticoat nozzle on the inside thereof interposed between said feeder barrel and said conveyor line, said nozzle having a space therearound communicating with the conveyor line, and means for introducing compressed air tangentially into the space around the petticoat nozzle.

2. In a transport for finely divided material, the combination of a feeder barrel, a feed screw therefor, a conveyor line for pneumatically conveying the discharge of the barrel, a petticoat nozzle surrounding the screw shaft at the end of the screw, a second petticoat nozzle at the point of entrance into the conveyor line, a fitting interposed between said two petticoat nozzles, and means for introducing compressed air tangentially into the space around said petticoat nozzles.

3. In a transport for finely divided material, the combination of a feeder barrel, a feed screw therefor, a conveyor line for pneumatically conveying the discharge of the barrel, a ring-like member carrying a petticoat nozzle on the inside thereof surrounding the screw shaft at the end of the screw, a second ring-like member at the point of entrance into the conveyor line, a fitting interposed between said two ring-like members, and means for introducing compressed air tangentially into the space around said petticoat nozzles.

In testimony whereof I have hereunto signed my name.

JOE CRITES.